United States Patent [19]

Schoonheere et al.

[11] Patent Number: 4,930,410
[45] Date of Patent: Jun. 5, 1990

[54] METHOD OF DENSITY CONTROL IN RECTANGULAR BALERS TO IMPROVE THE BALE TYING OPERATION

[75] Inventors: Marnix J. Schoonheere, Ichtegem; Christiaan A. C. Lippens, Sint-Laureins; Adrianus Naaktgeboren, Zedelgem, all of Belgium

[73] Assignee: Ford New Holland, Inc., New Holland, Pa.

[21] Appl. No.: 338,175

[22] Filed: Apr. 14, 1989

[51] Int. Cl.⁵ .............................................. B65B 13/02
[52] U.S. Cl. ......................................... 100/3; 100/41; 100/43; 100/191
[58] Field of Search ......................................... 100/2–4, 100/35, 41, 43, 48, 50, 179, 189, 191, 99; 56/341, 343; 289/1.5, 2, 18.1

[56] References Cited

U.S. PATENT DOCUMENTS

| | | | |
|---|---|---|---|
| 3,862,592 | 1/1975 | Freeman | 100/4 |
| 4,088,068 | 5/1978 | White et al. | 100/3 |
| 4,493,498 | 1/1985 | Vansteelant | 289/2 |
| 4,624,180 | 11/1986 | Strosser | 100/41 |
| 4,627,341 | 12/1986 | Sudbrack et al. | 100/41 |
| 4,729,301 | 3/1988 | Smith et al. | 100/3 X |
| 4,753,463 | 6/1988 | Strosser | 100/41 X |
| 4,753,464 | 6/1988 | Jackson | 289/2 |

*Primary Examiner*—Harvey C. Hornsby
*Assistant Examiner*—Stephen F. Gerrity
*Attorney, Agent, or Firm*—Griffin, Branigan & Butler

[57] ABSTRACT

A rectangular baler has a density control for controlling the density to which crop material is compacted by a cyclically operating plunger, and a cyclically operating tying mechanism for tying loops of binding material around successive lengths of the compacted crop material to form bales. In order for the tying mechanism to function properly the binding material must slide between a tied bale and the crop material being compacted against the tied bale. If the sliding friction is too great, the binding material breaks or is pulled free of the tying mechanism thus resulting in failure of the tying process. To reduce the sliding friction, the compaction density is reduced for an interval of time following each cycle of the tying mechanism. The interval of time may be tolled by counting a number of plunger cycles immediately following a cycle of the tying mechanism, the density control being set for reduced compaction density until the number of plunger cycles has been counted.

2 Claims, 3 Drawing Sheets

METHOD OF DENSITY CONTROL IN RECTANGULAR BALERS TO IMPROVE THE BALE TYING OPERATION

FIELD OF THE INVENTION

The present invention relates to rectangular balers for picking up a crop material from a field, compacting it into rectangular bales, and tying the bales with twine. The invention comprises an improvement in rectangular balers of the type disclosed in Strosser U.S. Pat. Nos. 4,624,180 and 4,753,463, the disclosures of which are incorporated herein by reference.

BACKGROUND OF THE INVENTION

In conventional rectangular balers, crop material is picked up from the ground by a pick-up unit and fed into an elongated bale case or chamber. The crop material is fed into the bale case in timed sequence with a reciprocating plunger. The plunger compresses the crop material, gradually forming a bale and advancing it toward an exit opening in the bale case. When the bale being formed reaches a desired length, a tying mechanism is actuated to wrap at least one loop of binding material around the bale, tie a knot in the binding material, and cut the tied loop from the supply of binding material. This tying operation leaves an end portion of the binding material from the supply so that it extends across the bale case. After the tying operation, the formation of a new bale begins and as the new bale is formed it forces the tied bale and a portion of the binding material toward the exit opening in the bale case, the binding material sliding between the tied bale and the new bale being formed as both are forced to move toward the exit opening.

As disclosed in U.S. Pat. No. 4,624,180, a baler of the type described above may have its operations automatically controlled by a microprocessor. In addition, an operator may input information into a control panel so that the baler automatically forms bales compacted to a desired density.

When baling damp silage crop at a desired density, the tying process may intermittently fail. Failure occurs either because of breakage of the binding material or because the binding material is pulled from the tying mechanism. Both types of failure usually occur within a few plunger strokes after a cycle of the tying mechanism. It is during this interval that the binding material encounters the greatest resistance to sliding between the tied bale and the new bale being formed as both are pushed toward the exit opening in the bale case. It has been found that failures of the tying mechanism can be substantially reduced by operating the density control mechanism so that for the first few strokes of the plunger after each bale is tied, the incoming crop material is compacted to a lower density.

SUMMARY OF THE INVENTION

An object of the present invention is to provide a novel method of reducing the frequency of failure of the bale tying process in a rectangular baler.

An object of the present invention is to improve the reliability of the bale tying process in a rectangular baler which normally compacts crop material to a first, desired density by controlling the baler to compact the crop material to a second, lower density for an interval of time immediately following each cycle of the tying mechanism.

An object of the present invention is to improve the reliability of the bale tying process in a rectangular baler having a compaction plunger for normally compacting crop material to a first, desired density by controlling the baler to compact the crop material to a second, lower density for several cycles of the plunger following each cycle of the tying mechanism.

An object of the present invention is to provide a method of reducing the frequency of failure of the bale tying process in a rectangular baler having a cyclically operating plunger for compacting a crop material entering a bale case, a cyclically operable tying mechanism for tying loops of binding material around successive lengths of compacted crop material to form bales, and control apparatus settable to control the density at which the crop material is compacted. According to the method, the control apparatus is set to normally compact the crop material to a first, desired density but the control apparatus is set to compact the crop material to a second, lower density for a few plunger cycles following each cycle of the tying mechanism.

Other objects of the invention and its mode of operation will become apparent upon consideration of the following description and the accompanying drawings.

DETAILED DESCRIPTION OF THE INVENTION

Figure 1:
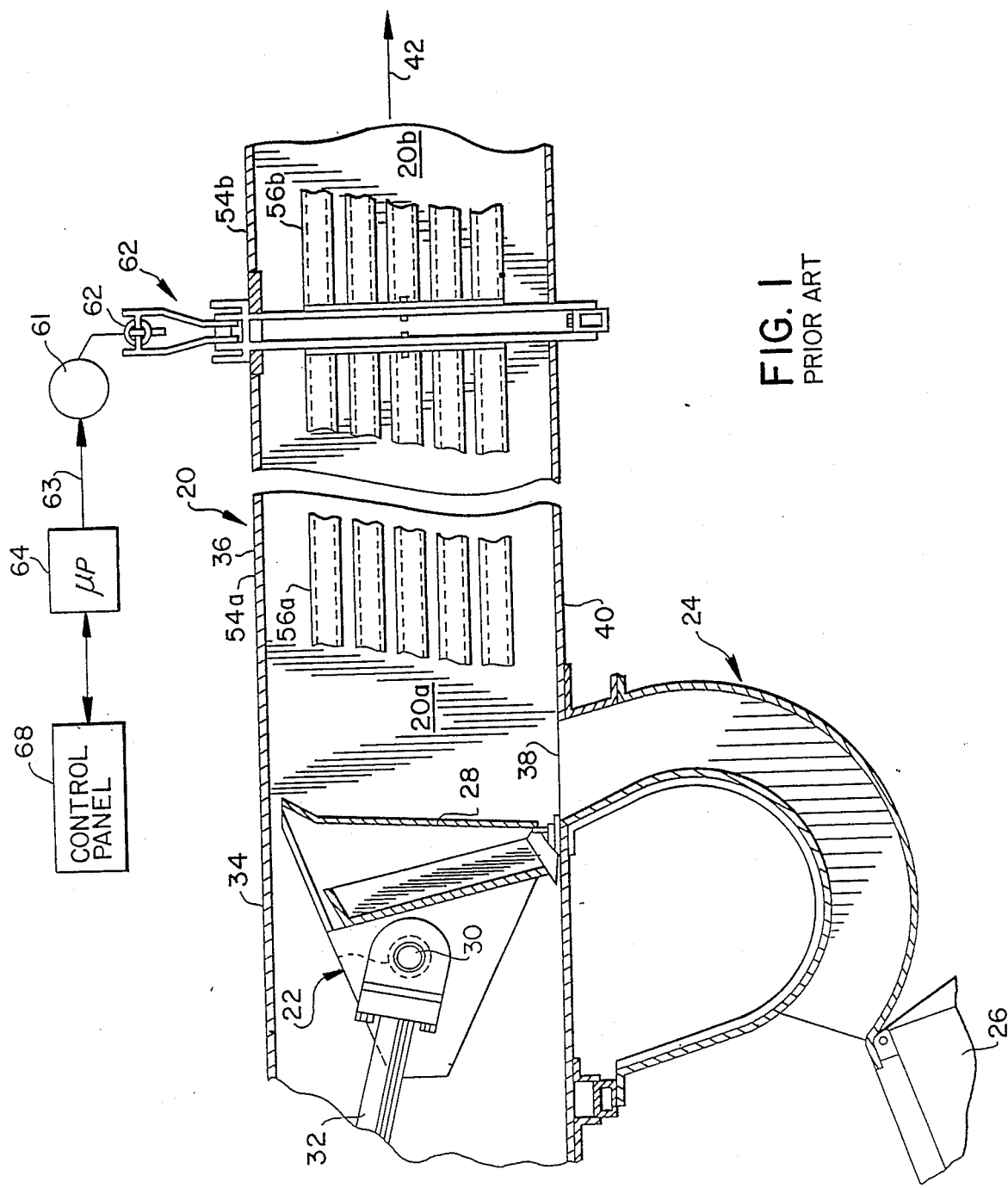
FIG. 1 schematically illustrates a bale density control system and shows a side elevation, partly in section, of the bale case and plunger in a rectangular baler.

FIG. 1 illustrates a portion of a rectangular baler of known design, including a bale case 20, a plunger assembly 22, a feed chamber 24 and a pick-up mechanism 26. The plunger assembly includes a plunger element 28 connected by wrist pins 30 to a pair of connecting rods 32. As the connecting rods 32 are driven by a drive source (not shown) the plunger 28 cyclically moves back and forth in a first portion 34 of the bale case. A second portion 36 of the bale case includes movable top rails 54a, 54b and side rails 56a, 56b. A tension adjusting mechanism 60 is provided for moving the rails 54a, 54b, 56a, and 56b to thereby vary the cross-sectional area of regions 20a and 20b of the bale case. The tension adjusting mechanism 60 includes a hydraulic cylinder unit 62 for moving the movable rails and a current controlled pressure valve 61 for controlling the hydraulic cylinder unit 62. A microprocessor based control circuit 64 controls the operation of the baler and provides a pulse width modulated signal over lead 63 to control valve 61. An operator's control and indicator panel 68 is provided so that an operator may manually key in control data and observe indications of operating conditions in various parts of the baler.

The system shown in FIG. 1 is fully described in U.S. Pat. No. 4,624,180. Briefly, an operator selects a desired density depending on the crop to be harvested, its moisture content, etc. The selected density value is keyed into the system at the control and indicator panel 68.

The microprocessor 64 samples the desired density value and compares it with a value representing the actual density to which crop material entering the bale case 20 is being compacted. This value is derived by sensing the load placed on connecting rods 32 in driving crop material through bale case 20. From the value representing actual density and the input representing desired density, the microprocessor 64 derives a signal to control the valve 61 thereby adjusting the positions of rails 54a, 54b, 56a, and 56b. This changes the cross-sectional areas of the regions 20a and 20b of the bale case 20, thereby changing the force which plunger 28 must exert on the crop material to force it through the bale case. Thus, the density to which crop material is compacted is controlled by microprocessor 64 as it controls the rails.

As the baler moves over the ground, crop material is picked up by pick-up mechanism 26 and fed through feed chamber 24 so that it enters the bale case through an opening 38 in the bottom wall 40 of the bale case. The plunger 28 cyclically moves back and forth in the bale case 20 and each time it moves to the right it compacts crop material which has entered the bale case through opening 38 against already-compacted crop material. As more crop material is compacted it is forced in the direction of arrow 42 toward an exit opening (not shown) at the rear end of the bale case.

Figure 2A:
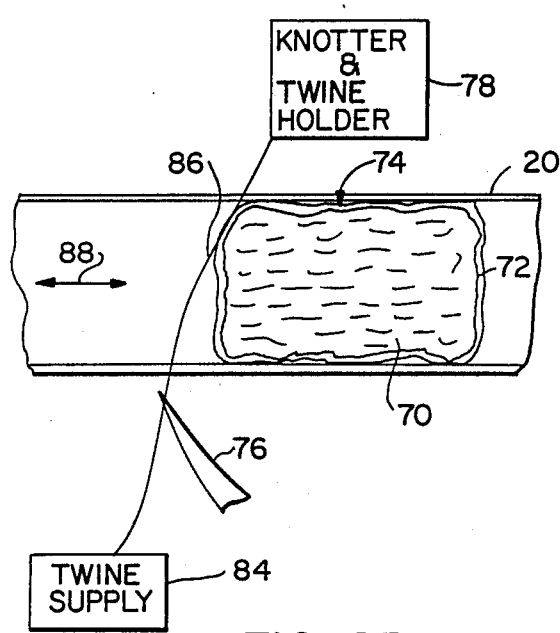
FIGS. 2A and 2B are schematic views illustrating the problem solved by the present invention.

Before the crop material exits from bale case 20 it is, in effect, separated into bales by a bale tying mechanism of conventional design. The bale tying mechanism is not shown in FIG. 1 but its purpose is to wrap loops of a binding material such as twine or wire around successive lengths of crop material in the bale case, tie knots in the loops, and cut the tied loops from the binding material supply. FIG. 2A schematically illustrates a bale 70, located in bale case 20, and surrounded by a loop of binding material (twine) 72 in which a knot 74 has been tied. The loop 72 and knot 74 have been formed by a tying mechanism including a needle 76 located below the bale case and a knotter and holder, collectively designated 78, located above the bale case. The bale tying mechanism may, for example, be of the type described in U.S. Pat. No. 4,493,498.

Figure 2B:
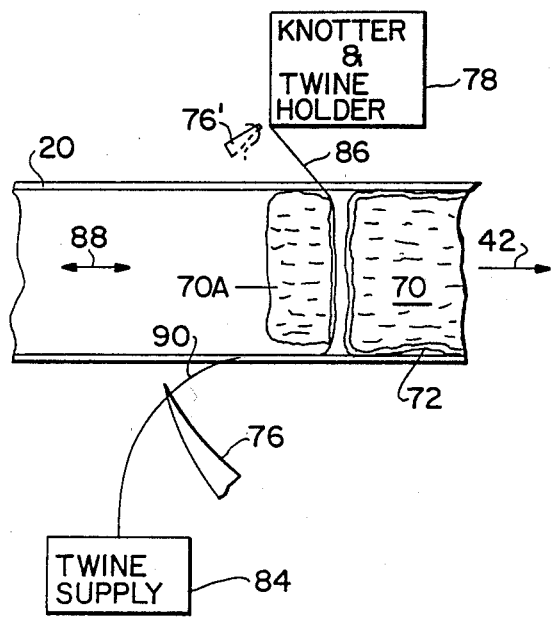

FIG. 2A shows the position of a twine at the end of a cycle of the tying mechanism. Twine from a twine supply 84 extends through the end of needle 76 and an end portion 86 of the twine extends through the bale case and is held by the holder 78. The end portion 86 has been severed from the knot 74. Referring now to FIG. 2B, as more crop material enters bale case 20 and is compacted by reciprocating the plunger as indicated by arrow 88, the compacted crop material begins forming a new bale 70A. As bale 70A is formed, both it and bale 70 are pushed in the direction of arrow 42 toward the exit opening of the bale case. This movement of bale 70A draws twine from twine supply 84. At the same time, and because the upper end of the twine is held by twine holder 78, the twine slides upwardly between bale 70 and partially formed bale 70A if the crop material is not being compacted so tightly that it prevents the twine from sliding. If the sliding friction should be too great then the twine will not slide but will break or its end will pull loose from the twine holder 78 and the tying process will fail.

Assuming normal operation, after a desired length of crop material has been compacted into bale 70A, the tying mechanism is actuated. The needle 76 swings arcuately upwardly through the bale case and delivers a portion 90 of the twine to knotter and twine holder 78 as indicated at 76'. The needle 76 returns to its initial position while the knotter and twine holder tie a knot with the twine portions 86 and 90, sever the twine at portion 90, and leave a new twine portion 86 held by holder 78.

As described above with respect to FIG. 2B, the twine portion 86 may break or pull free of twine holder 78 if the crop material in partially formed bale 70A is too densely compacted against bale 70. The breakage or pulling free usually occurs within three to five plunger strokes after the tying mechanism has completed its cycle of operation. It is believed that after three to five plunger cycles the twine forms a groove across the face of the compacted crop material 70A so that the sliding friction is reduced. Therefore, by reducing the degree of compaction of the crop material 70A, i.e. by reducing the density to which it is compacted during the first few plunger cycles after completion of a cycle of the tying mechanism, a method is provided for reducing the frequency of failure of the tying process. When subsequently the controller 64 sets the density level back to the "normal" value, the density in the initial portion of bale 70A is increased accordingly without however hampering the continued sliding movement of the twine through the groove during the remainder of the bale forming cycle.

The system disclosed in Strosser U.S. Pat. No. 4,624,180 may be easily modified to operate according to the method of the present invention. The operator control and indicator panel 68 may be modified to provide for operator input of two additional input parameters. By operation of the modified panel the operator may enter the percentage by which the normal density is to be reduced after each cycle of the tying mechanism, and the number of plunger strokes the reduced density is to be effective. These values are stored in a memory at locations designated STROKES TOT and % DECREASE. The program of the microprocessor 64 is also modified to include an SPC subroutine such as that illustrated in FIG. 3. This routine may be included in the LOOP routine described in the Strosser patent and is preferably located at a point in the routine subsequent to the calculation of the PWM value which is used to derive the pulse width modulated signal for controlling valve 61.

Figure 3:
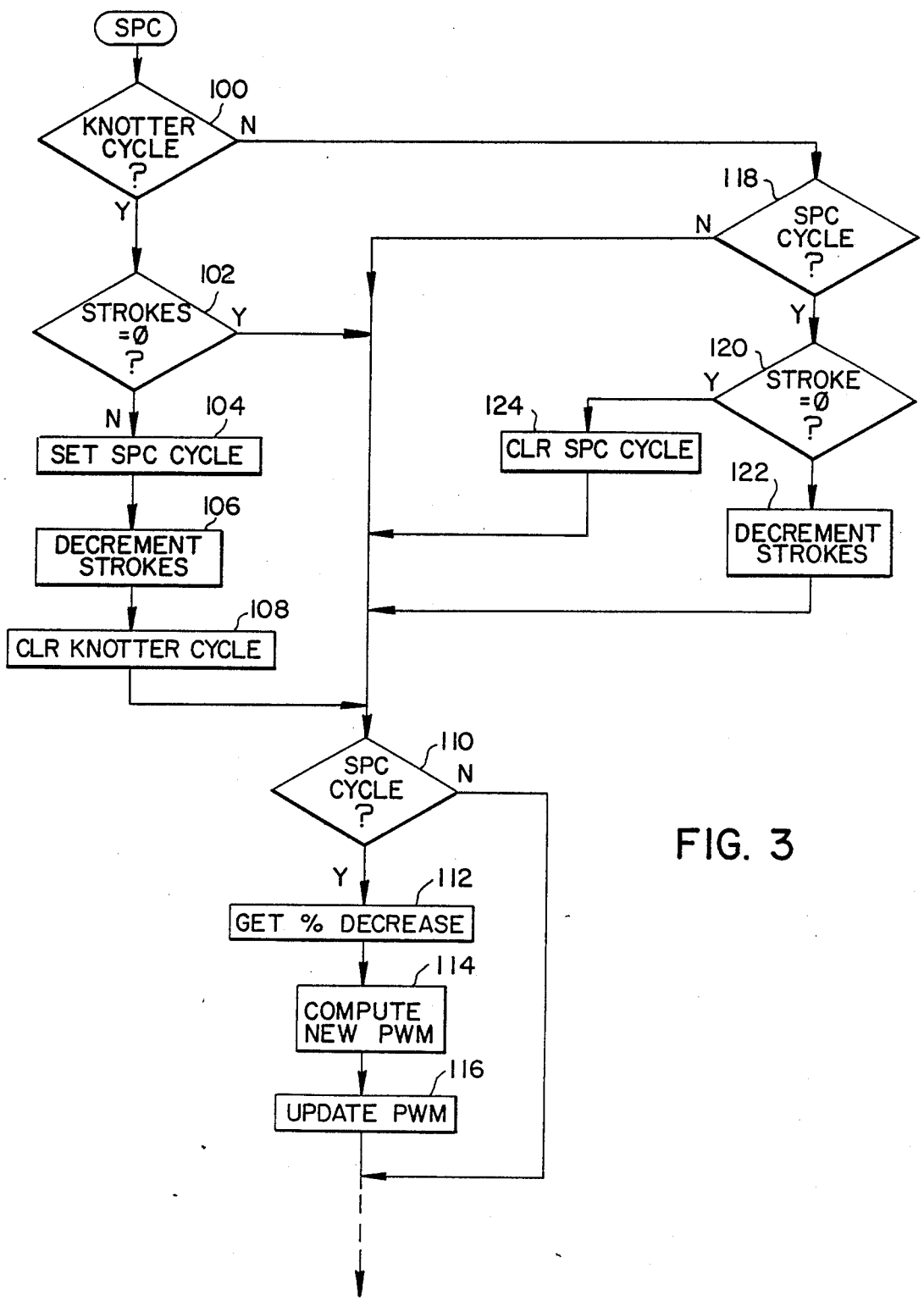
FIG. 3 is a flow diagram illustrating a subroutine suitable for use in a microprocessor controlled rectangular baler to control the baler in accordance with the present invention.

In FIG. 3, the SPC routine begins at step 100 where it checks to see if an SPC knotter cycle start flag has been set. The SPC knotter cycle start flag is set at the same time as a flag latch 206A described in Strosser U.S. Pat. No. 4,753,463, and indicates that a knotter cycle has taken place. If the test at step 100 indicates that a knotter cycle has taken place, the routine proceeds to step 102 where the value STROKES TOT is copied into a temporary location designated STROKES. STROKES is then tested to see if it has a zero value. If it does not, the routine proceeds to step 104 where it sets an SPC CYCLE flag. The value in STROKES is decremented at step 106 and the KNOTTER CYCLE FLAG is cleared at step 108 before the program proceeds to step 110.

At step 110 the SPC CYCLE flag is tested. Since the flag was set at step 104, the test proves true and the program moves to step 112. Step 112 reads the value % DECREASE from memory. Step 114 multiplies this value by the PWM value which was calculated prior to the start of the SPC routine and stored at location PWM. The product is then subtracted from the value in PWM. At step 116 the value in PWM is updated by replacing it with the resulting value computed at step 114. Subsequently, and as explained more fully in Strosser U.S. Pat. No. 4,624,180, the new value in PWM is processed to develop a pulse width modulated signal which is applied to valve 61 to thereby adjust rails 54a, 54b, 56a and 56b, which, in turn, reduce the density of compaction of the crop material.

On the next plunger stroke, when the LOOP routine is executed and reaches step 100 of the SPC routine, the test will indicate that no new knotter cycle has started. The program branches to step 118 where the SPC CYCLE flag is tested. Since the SPC CYCLE flag was set at step 104, the program moves to step 120, where the value STROKES is tested. If the value of STROKES is not equal to zero, it is decremented at step 122. The program then proceeds through steps 110, 112, 114 and 116 as previously described.

Each subsequent plunger stroke causes another execution of the LOOP routine as described in U.S. Pat. No. 4,624,180. During each execution the program moves through steps 100, 118, 120, 122 etc. as described above. This continues until the value STROKES is decremented (at step 122) to zero. On the next execution of LOOP the program again executes steps 100, 118 and 120, but at step 120 the test proves true. The program branches to step 124 where the SPC CYCLE flag is cleared. The program tests the SPC CYCLE flag at step 110 and since the flag has been reset, the program branches around steps 112, 114 and 116. Thus, the PWM value calculated prior to each execution of the SPC cycle remains in location PWM and is used to generate the pulse width modulated signal which is applied to valve 61 to control the density to which the crop material is compacted.

Once the SPC cycle flag is cleared, the normal (higher) density value entered through the operator's panel, and stored in memory is used to generate the pulse width modulated signal applied to valve 61. The SPC routine does not modify the value calculated from the density value and stored at location PWM. Each execution of LOOP causes the SPC routine to be executed but the routine finds, at step 100, that the knotter has not initiated a new cycle, and at steps 118 and 110 that the SPC CYCLE flag is not set. Thus, the SPC routine does not change the value in location PWM. The execution of steps 100, 118 and 110 is repeated for each plunger stroke until another knotter cycle is initiated to set the KNOTTER CYCLE START flag.

From the foregoing description it is seen that the present invention provides a novel method of reducing the frequency of failure of the tying process in a rectangular baler. While a specific apparatus has been described for carrying out the method disclosed herein, it will be understood that other apparatus may be employed. For example, the values STROKES TOT and/or % DECREASE may be permanently stored in a memory in controller 64. It is intended therefore to be limited only by the scope of the appended claims.

The embodiments of the invention in which an exclusive property or privilege is claimed are defined as follows.

We claim:

1. In a rectangular baler having control means for controlling the density to which a crop material entering a bale case is compacted, a cyclically operable compacting means for compacting said crop material and pushing said compacted crop material toward an exit opening in said bale case, and a cyclically operable tying mechanism for carrying out a tying process wherein loops of a binding material are tied around successive lengths of said compacted crop material, said loops separating said crop material into bales, said tying mechanism, at the end of each cycle thereof, holding a portion of said binding material which is to become part of the next loop such that said portion extends across said bale case in the path of compacted crop material, a method for reducing the frequency of failure of the tying process, said method comprising:

operating said control means so that crop material entering said bale case is compacted to a first density for an interval of time after the completion of each cycle of said tying mechanism after which the said crop material is compacted to a second density greater than said first density until the succeeding cycle of said tying mechanism is initiated.

2. In a rectangular baler having control means for controlling the density to which a crop material entering a bale case is compacted, a cyclically operable compacting means for compacting said crop material and pushing said compacted crop material toward an exit opening in said bale case, and a cyclically operable tying mechanism for carrying out a tying process wherein loops of a binding material are tied around successive lengths of said compacted crop material, said loops separating said crop material into bales, said tying mechanism, at the end of each cycle thereof, holding a portion of said binding material which is to become part of the next loop such that said portion extends across said bale case in the path of compacted crop material, a method for reducing the frequency of failure of the tying process, said method comprising:

operating said control means so that crop material entering said bale case is normally compacted to a first density but is compacted to a second density less than said first density for a predetermined number of cycles of said compacting means.

* * * * *